United States Patent [19]

Rosso

[11] E Re. 29,492

[45] Reissued Dec. 13, 1977

[54] FIXING BINDING STRIPS TO KNITWEAR ON LINKING MACHINES

[75] Inventor: Pietro Rosso, Turin, Italy

[73] Assignees: Rosso Pietro & C. S.p.A., Turin; Calzificio Fratelli Protasoni Societa' di fatto di Mario e Trento Protasoni, Gallarate (Varese), both of Italy

[21] Appl. No.: 577,977

[22] Filed: May 15, 1975

Related U.S. Patent Documents

Reissue of:

[64] Patent No.: 3,732,832
Issued: May 15, 1973
Appl. No.: 114,450
Filed: Feb. 11, 1971

[30] Foreign Application Priority Data

Feb. 17, 1970 Italy ..... 67521/70

[51] Int. Cl.[2] ..... D05B 7/00

[52] U.S. Cl. ..... 112/25; 2/243 R; 2/274; 66/170; 112/413

[58] Field of Search ..... 112/25-27, 112/262, 265, 416, 418, 419, 413; 66/169 R, 170, 171, 190, 172 R; 2/243 R, 274

[56] References Cited

U.S. PATENT DOCUMENTS

| | | | |
|---|---|---|---|
| 3,265,021 | 8/1966 | Mathews | 112/25 |
| 3,340,834 | 9/1967 | Rosso et al. | 112/25 |
| 3,479,976 | 11/1969 | Flach et al. | 112/25 |
| 3,487,797 | 1/1970 | Pellogio | 112/27 |
| 3,494,310 | 2/1970 | Merkle | 112/27 |
| 3,505,964 | 4/1970 | Flaque | 112/25 |
| 3,732,832 | 5/1973 | Rosso | 112/25 |

*Primary Examiner*—G. V. Larkin
*Attorney, Agent, or Firm*—Sughrue, Rothwell, Mion, Zinn and Macpeak

[57] ABSTRACT

In order to allow the so called "casual" impaling of the edges of the binding strip and of the knit-wear article on the points of the rotary dial of a linking machine, the strip is formed at its opposite longitudinal edges with tabs which are superimposed on the inner face of the binding strip before the latter is bent to channel shape. Thicker end portions are formed on the free longitudinal edges of said tabs in order to permit semi-automatic impaling of the binding strip onto the points using guides provided with through slots directed towards the annular path of the points. A further guide allowing a semi-automatic impaling of the article edge to be sewn to the binding strip, may be also provided.

29 Claims, 21 Drawing Figures

INVENTOR

PIETRO ROSSO

Figure 1:
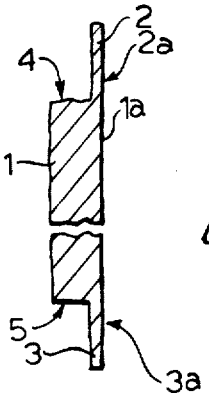

BY Sughrue, Rothwell, Mion, Zinn & Macpeak

ATTORNEYS

FIXING BINDING STRIPS TO KNITWEAR ON LINKING MACHINES

Matter enclosed in heavy brackets [ ] appears in the original patent but forms no part of this reissue specification; matter printed in italics indicates the additions made by reissue.

Attachment of bindings to parts of knitted articles of wear requires the loops in the binding and knitted fabric to be accurately run onto the points on the rotary dial of the linking machine. This necessitates placing firstly on the consecutive points on the dial the consecutive loops in one course formed at one longitudinal edge of the binding, then running on the same points the consecutive loops in a course at the marginal portion of the knitted fabric, finally placing on the points the consecutive loops in the course formed at the other longitudinal edge of the binding.

These steps cannot be carried out at great speed and require a particular skilfulness of the operator. The method is therefore slow and expensive, moreover skilled operators are not readily available.

Any inaccuracy in running the loops onto the points results in starting points for ladders in the finished article. The binding strip should be provided with selvedges and is therefore made of ribbed knit.

The invention obviates the above drawbacks by providing a method of attaching binding or trimming strips to parts of knitted articles of wear on a linking machine, by which the strip and article to which the strip has to be attached can be placed on the points with accuracy using in the less expensive so-called casual manner which is already known and employed in sewing knitted articles on linking machines such as for closing the toes of stockings.

A further object of the invention is to provide a method of the type referred to above which can be mechanized by the use of special guides adapted to facilitate casual running of the loops in the strip and article onto the points on the dial of the linking machine.

A still further object of the invention is to provide guides adapted to facilitate and expedite work.

With the above objects in view the invention provides a method of attaching binding strips and knitting articles on a linking machine, which distinguishes by comprising the following steps:

a. forming a knitted binding strip provided with auxiliary longitudinal tabs extending from the opposite edges of the actual strip to be attached to the knitted article;

b. running the knitted article and strip onto the points on the rotary dial of a linking machine in such manner that the strip takes a channel shape, one at least of its tabs being juxtaposed to the inner channel face, in such manner that the marginal portion of said knitted article extends a certain length within the channel;

c. forming on said linking machine a chain-stitch seam joining the opposite edge portions of the strip to the knitted article.

According to a preferred embodiment of the invention the auxiliary tabs on the strip are formed at least at their portions adjacent the knit of the actual strip of a smaller thickness than the knit of the actual strip.

According to a further feature of the invention in order to make possible the use of guides for placing the strip on the points on the rotary dial of the linking machine the tabs on the strip are formed with a first section adjacent the knit of the actual strip of a smaller thickness than the knit of the actual strip, and with a further marginal section of increased thickness with respect to the former.

Figure 2:
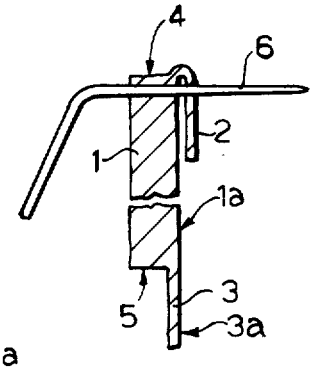
Figure 3:
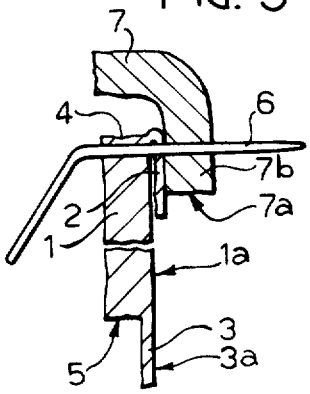
Figure 4:
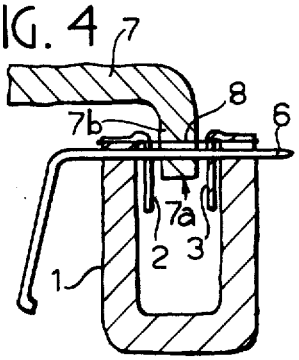
Figure 5:
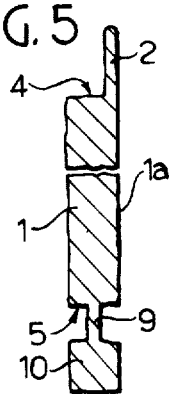
Figure 6:
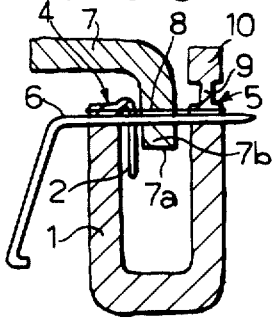
Figure 8:
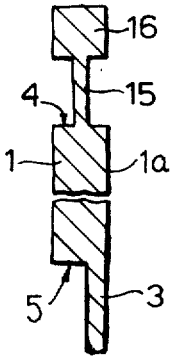
Figure 9:
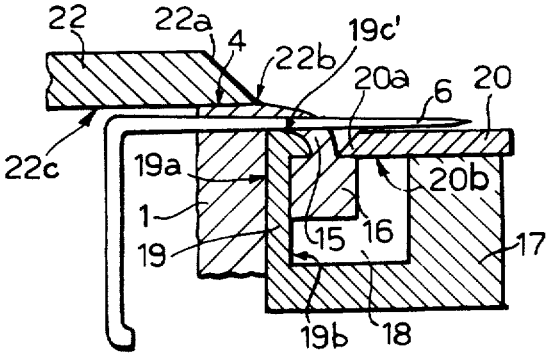
Figure 7:
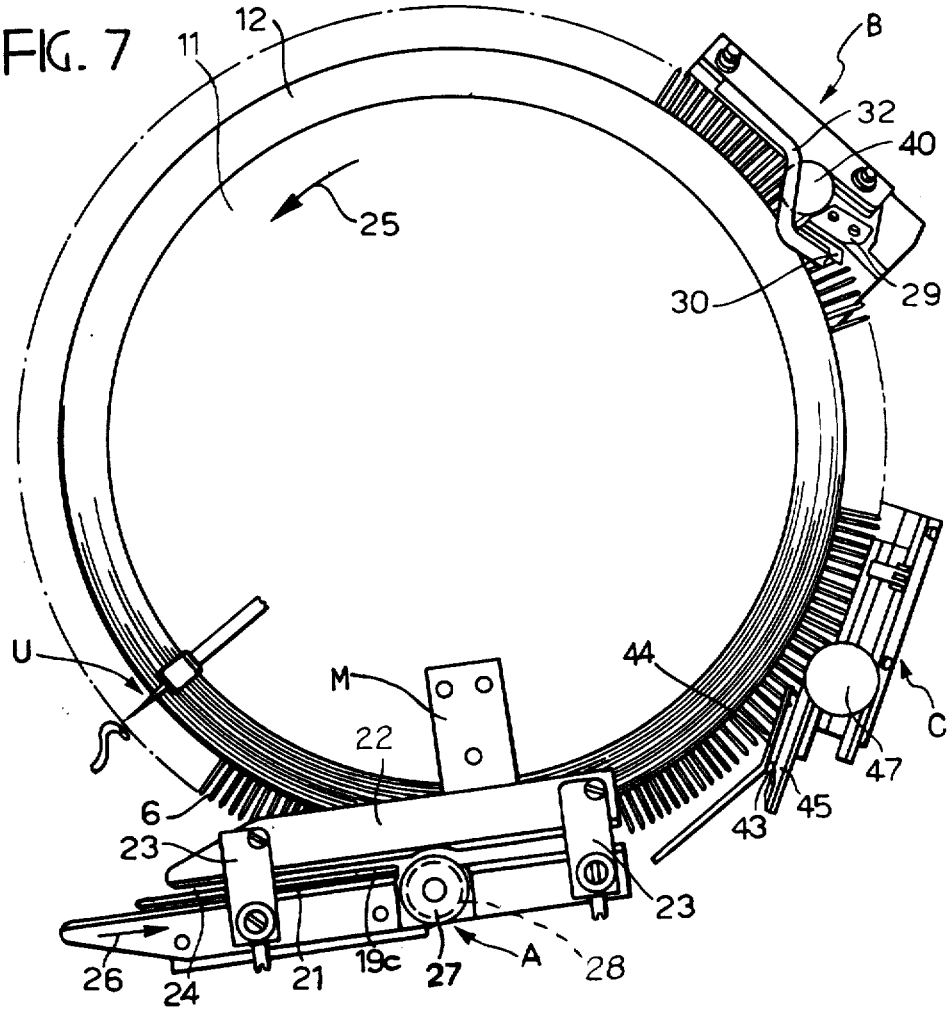
Figure 11:
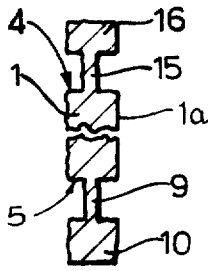
Figure 10:
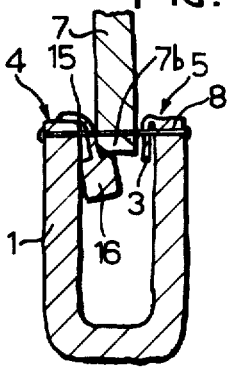
Figure 12:
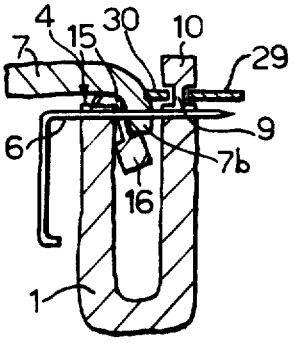
Figure 20:
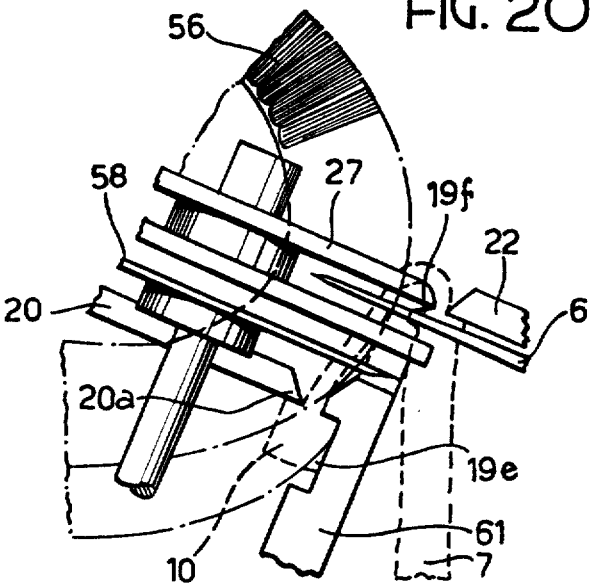
Figure 13:
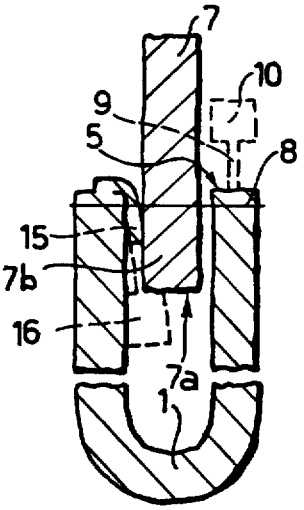
Figure 21:
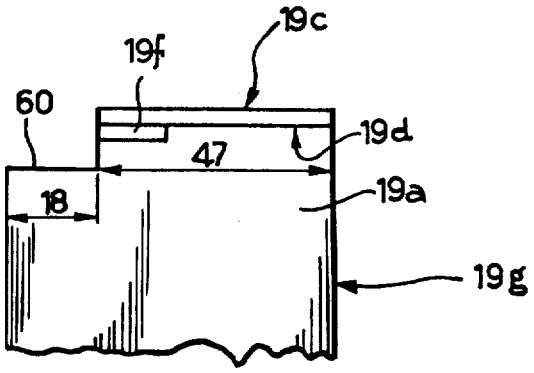
Figure 14:
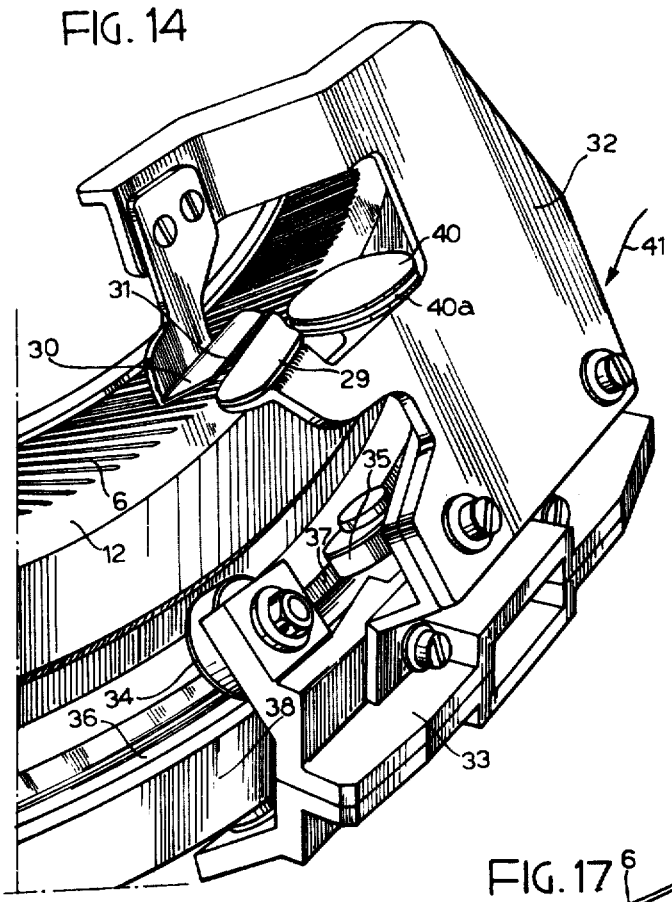
Figure 17:
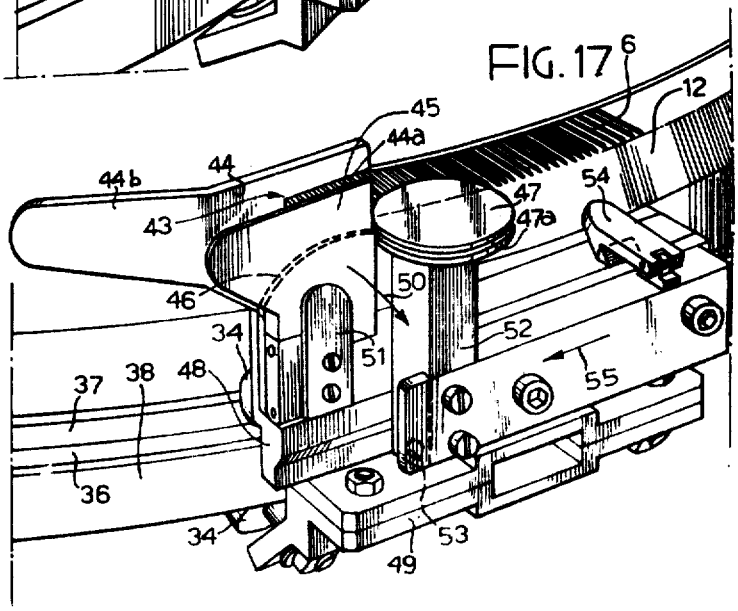
Figure 15:
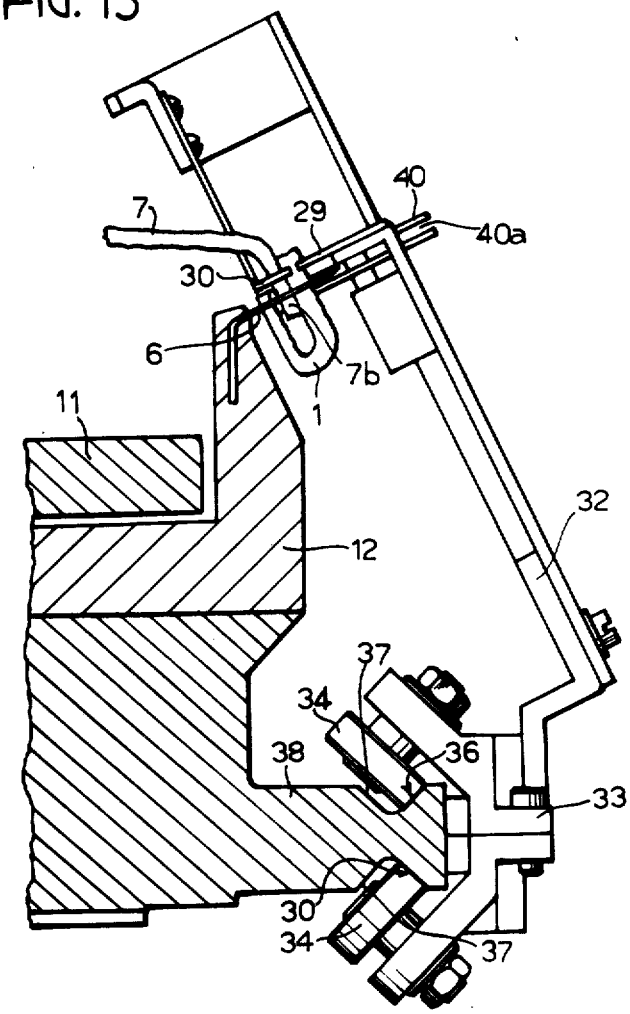
Figure 16:
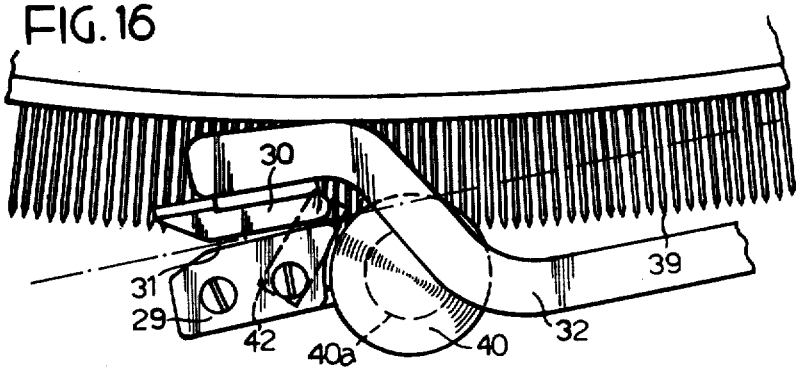
Figure 18:
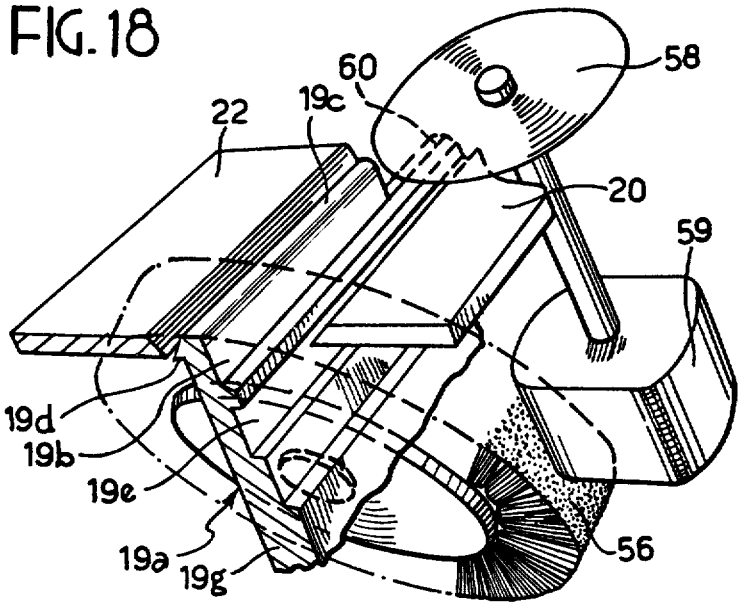
Figure 19:
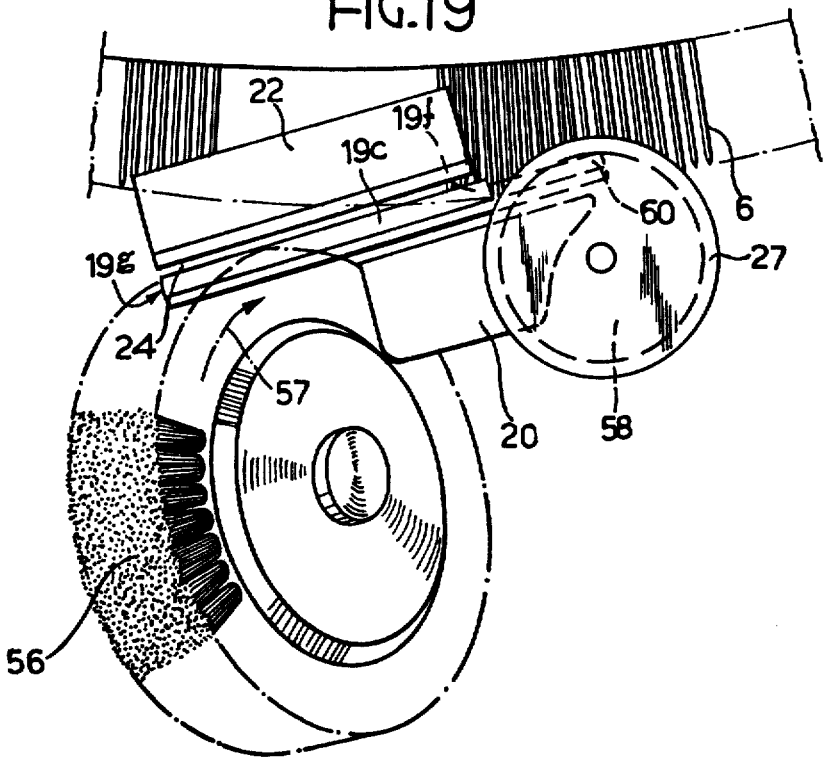

Further characteristic features and advantages of the invention will be understood from the appended description of embodiments of the method according to the invention given by way of examples only, shown on the accompanying drawings, wherein:

FIG. 1 is a cross sectional view of a binding strip prepared for carrying out the method of the invention, FIG. 2 is a cross sectional view showing the strip of FIG. 1 after a marginal portion thereof has been run onto the points on the rotary dial of a linking machine, FIG. 3 is a sectional view similar to FIG. 2, after placing the knitted article to which the strip is to be attached on the points, FIG. 4 is a sectional view similar to FIGS. 2 and 3, showing the situation after the other edge of the strip has been run onto the points on the dial, FIG. 5 is a cross sectional view showing a modified binding strip, suitable for carrying out the method of the invention, FIG. 6 is a sectional view showing the binding strip of FIG. 5 and the knitted article to which the strip shall be attached after they have run onto the points on the dial of a linking machine, FIG. 7 is a view of the underside of the circular bedplate provided with a rotary dial of a linking machine equipped with three types of guides adapted to facilitate impaling of the edges of binding strips on the points, and of the marginal portion of the knitted article to which the strip should be attached, FIG. 8 is a sectional view showing a further embodiment of a binding strip suitable for carrying out the method according to the invention by the use of one of the guides shown in FIG. 7, FIG. 9 is a sectional view showing the use of said guide for impaling on the points one of the marginal portions of the strip, FIG. 10 is a part sectional view showing the article obtained by the use of the guide shown in FIG. 9, before trimming thereof, FIG. 11 is a sectional view showing a further strip embodiment suitable for carrying out the method of the invention by the use of both guides shown in FIG. 7, FIG. 12 is a sectional view showing the use of a further guide for impaling on the points the other marginal portion of the strip shown in FIG. 11, and FIG. 13 is a part cross sectional view showing the finished article obtained by carrying out the modified method employing both guides, FIG. 14 is a perspective view of the guide shown in FIG. 13, FIG. 15 is a cross sectional view of the guide, FIG. 16 is a part plan view thereof, FIG. 17 is a perspective view of the three guides shown in FIG. 7, FIG. 18 is a part perspective view of a modified consturction of the first guide, FIG. 19 is a part plan view thereof and FIG. 20 is a front view thereof in the direction of the arrow X—X in FIG. 19;

FIG. 21 is an elevation of a detail of the construction shown in FIGS. 18 to 20.

Corresponding parts are denoted by the same reference numerals throughout the figures.

By the embodiment of the method shown in FIGS. 1 to 4 the actual binding strip 1 is formed with longitudinal tabs 2, 3 extending beyond its edges 4, 5, respectively. The tabs 2, 3 are less thick than the knit of the actual strip 1, said tabs being preferably knitted from a yarn other than the strip 1, such a semi-automatic yarn. They can be made of ribbed knit if they have to be provided with a selvedge. The knit of the actual strip is preferably of the ribbed type.

The knits to be joined are impaled on the points on the rotary dial of a linking machine by firstly bending over the tab 2 on the actual strip 1 to juxtapose the face 2a of said tab to the face 1a of the strip which is coplanar with the former. Thereafter the loops belonging to the course forming the edge 4 of the strip 1, or possibly the loops in a nearby course, and the loops in one course in the tab 2 are impaled on each of the points 6 on the rotary dial of the linking which is not shown in FIGS. 1 to 4, 5, 9 and 12. The loops in one of the courses in a knitted article 7, spaced from the edge 7a are impaled on the points 6 in order to reach the arrangement of the parts shown in FIG. 3.

The next step consists in bending the tab 3 over on the actual strip 1 to juxtapose the face 3a of the tab 3 on the face 1a of the strip. The strip is then folded to channel shape, and the loops in the course defining the edge 5 of the strip or in an adjacent course are run onto the points 6, thereby completing assembly of the parts on the points 6 on the dial, which by revolving with the latter move the knits to be joined to the operating region of the tools U of the linking machine adapted to form a chain-stitch seam 8 (FIGS. 4 and 7).

As will be understood from the drawings and foregoing description the edge portion 7b of the knitted article to be connected to the strip extends a certain length within the channel formed by bending the strip S to U-shape and the opposite faces of said edge portion are adjacent to the channel as shown in FIG. 4.

By the above method notwithstanding casual impaling no runs can be induced either in the article 7 or the strip 1 which can therefore be made as a "tubular" knit. The presence of the knitted article 7, marginal portion 7b and tabs 2 and 3 on the strip 1 safely prevent runs.

According to a modified embodiment, the actual binding strip is preliminarily formed with two longitudinal tabs differing in form. FIG. 5 shows a strip of this type which is provided at its edge 4 with a first tab 2 similar to the one shown in FIG. 1 and at its opposite edge 5 with a further tab including a first section 9 knitted of a thickness substantially less than the knit of the actual strip, and an outer section 10 of increased thickness equalling the thickness of the strip. The section 9 is knitted from a yarn other than the strip, preferably an elasticized yarn, whereas the section 10 can be knit from the same yarn as the strip, and the section 9 can be knit from a separating thread for the purpose explained hereafter.

Assembly of the strip 1 and knitted article to which it should be joined, is effected in the manner described with reference to FIGS. 2 to 4.

FIG. 6 shows the resulting article still on the points on the dial. The Figure shows that the provision of the tab 9, 10 facilitates running onto the points 6 of the loops in the actual strip, near the edge 5. This tab can be removed after completion of the seam. To this end it will be sufficient to pull the said separating section 9. In the latter case the portion of the strip 1 near the edge 5 shall conveniently include a few ribbed courses.

The method of the invention can be easily mechanized in part. For this purpose the circular bedplate 11 (FIG. 7) of the linking machine, situated within the rotary dial 12 carrying the points 6 has secured thereto three guides generally denoted by A, B and C.

The method can be carried out by employing the guide A only. The strip is then arranged to take the shape shown in FIG. 8, by which the edge portion 4 of the strip to be first impaled on the points is formed with a first tab including a first section 15 preferably knitted from elasticized yarn, differing from the tab 2 on the previously described strips in that it is centered with respect to the thickness of the strip, and is followed by a section 16 of increased thickness aligned with the strip 1.

The tab extending from the edge 5 of the strip shown in FIG. 8 is similar to the tab 3 on the strip shown in FIGS. 1 to 4.

The guide A comprises an elongated body portion 17 formed with an upwardly open groove 18 closed on the side of the body portion turned towards the rotary dial carrying the points 6 by a wall 19 the outer vertical face 19a of which acts as a bearing surface for the portion of the face 1a of the strip 1 near its edge 4. The straight groove 18 is almost completely closed at the top by an elongated plate 20, the tapered edge 20a of which is turned towards the rotary dial, defines together with the upper portion of the other face 19b of the likewise vertical wall 19 a narrow slit 21, FIG. 7, extending parallel to the vertical wall 19. The guide further comprises an elongated plate 22 (FIG. 7) arranged above the rotary dial 12 slightly spaced from the plane of movement of the points 6. The elongated plate 22 is connected to the plate 20 and body portion 17 of the guide by means of straps 23 and is connected to the stationary circular bedplate 11, FIG. 7, by means of bracket M. The plate 22 is formed with a tapered edge 22a turned towards the outside of the rotary dial 12, the edge 22b of which defines together with the top edge 19c of the wall 19 a narrow slit 24 extending parallel to the slit 21.

The guide A is so arranged with respect to the rotary dial 12 that the parallel slits 21, 24 are situated in vertical planes intersecting the annular path over which the points 6 move during rotation of the dial 12 in the direction of the arrow 25.

In order to facilitate impaling on the points 6 of the portion of the strip 1 near the edge 4, the face 1a of the latter is juxtaposed to the face 19a of the wall 19, FIG. 9, at the end of the latter remote from the dial 12. At the same time the thinner portion 15 of the first tab extending from the edge 4 is bent over around the edge 19c of the wall 19, the thicker section 16 of the said tab being fitted into the groove 18. As a result, displacement of the strip in the direction of the arrow 26, FIG. 7, will enable the edge 4 of the strip 1 to adhere to the bottom face 22c of the plate 22 near the edge 22b, thereby aligning the loops in the course forming the edge 4 and arranging them at the level of the points 6. The edge 4 of the strip is maintained at this level and the strip 1 is kept adjacent the wall 19 by the adherence of the thicker tab section 16 extending beyond the strip edge 4 and lower face 20b of the plate 20 and the step in the top portion of the face 19a of the wall 19. The difference in height of the faces 20b and 22c of the plate 22 is such as to stretch the section 15 on the tab extending beyond the edge 4 of the strip.

In order to automatically run onto the points 6 the loops in the course near the edge 4 of the strip, it will be sufficient to move the strip seated in the guide as described above in the direction of the arrow 26, FIG. 7, to the position at which the loops start being caught by the points 6 travelling over a slightly lowered portion 19c' of the edge 19c. As impaling of the loops starts the strip is automatically carried into the guide by effect of the rotation of the points 6 in the direction of the arrow 25. Impaling is facilitated by the provision of a loose roller 27 carried by the body portion 17, formed with a circumferential groove 28 into which the point ends fit. The further necessary steps for completing impaling on the points 6 of the loops in the elements to be joined are effected in the manner described above with reference to FIGS. 3 and 4.

In order to carry out the modified method by which also the edge 5 of the binding strip is impaled on the points 6 by the use of a guide, the strip is knitted as shown in FIG. 11. In this case the edge 5 of the strip is formed with a tab similar to the tab 9, 10 of the strip shown in FIG. 5. The guide B is then employed for impaling the loops in the course in the strip 1 defining the edge 5 or in a nearby course. The guide B comprises two plates 29, 30, arranged slightly above the annular path of the points and defining a preferably straight slot 31. The plates 29, 30 are mounted in a frame 32 carried by a slide 33 provided with a plurality of castor wheel pairs 34, 35 in crossed relationship as shown in FIG. 14, running over inclined tracks 36, 37 provided in a stationary circumferential flange 38 beneath the rotary dial 12. The slot 31 starts externally of the circular path of the free ends of the points 6, extends parallel to the annular path of the latter and ends internally of the circular path 39 followed by the free ends of points 6. The frame 32 has journalled thereon a roller 40 formed with a circumferential groove 40a, so arranged that the points 6 travel over said groove 40a. In order to use the guide B for impaling on the points 6 the edge portion of the strip 1 near the edge 5, a few loops near the edge 5 of the strip 1, situated at the end of the latter remote from the guide A are first run onto the points 6 at a region spaced from the guide A by an extent exceeding the strip length, of course after having impaled by means of the guide A the other marginal portion of said strip 1 and the marginal portion 7b of the knitted article 7. The guide B is then moved in the direction of the arrow 41, that is, towards the guide A, care being taken to cause the thinner section formed by the separating thread of the second tab on the binding strip through the slot 31. By moving the guide B in the direction of the arrow 41, the second tab on the strip is automatically impaled on the points with the assistance of the roller 40. A small cutter 42 shown in FIG. 16, which may be arranged across the end portion of the slot automatically cuts the separating thread 9 and severs the thickened portion 10 on the second tab.

By means of the third guide C impaling on the points 6 also of the marginal portion 7b of the knitted fabric to which the strip 1 should be joined is caused to take place in a semiautomatic manner. The guide C shown in FIG. 17 comprises a U-shaped channel 43 which is open upwardly and is preferably straight. The channel comprises two parallel portions 44, 45 and a bottom portion 46 fast with the wall 44. The channel is directed towards the inside of the circular path 39 of the free ends of the points 6 and diverges from the circular path in the direction of the guide A. The wall 44 is formed at its end portion near the points 6 with a longitudinal notch 44a which the points travel, and at its opposite end with an extension 44b bent over almost tangentially to the circle 39. The wall 45 is nearly tangential to the circle 39 at the region in front of the notch 44a so that the points travel across the channel 43. The bottom wall 46 is fully beneath the path of the points and slopes upwardly towards the channel end remote from the guide A. A roller 47 is loosely mounted near the channel end turned towards the points and is formed with a circumferential groove 47a through which the points 6 travel. The roller 47 operates similarly to the rollers 27 and 40 described above. The wall 44 is secured to a web 48 carried by a slide 49 displaceably mounted over the tracks 36 and 37 in the stationary flange 38 by means of roller pairs, one roller pair 34 only being shown in FIG. 17, the roller pairs being similar to the rollers 34 and 35 on the slide 33. The wall 45 may be tilted in the direction of the arrow 50 against the action of the spring 51. The roller 47 may be tilted with its respective support about the pivot 53 in the same direction with respect to the slide 49, after having lifted the hook 54 holding together the supports 52 and 48. During use of the guide C, effected after use of the guide A, the guide C is firstly removed from the guide A by an extent longer than the strip. The roller 47 and wall 45 of the channel are then bent over in the direction of the arrow 50 and a few loops in the marginal portion 7b of the knitted article placed on the bedplate 11 are impaled on the points 6 having mounted thereon the strip end remote from the guide A. The roller 47 and wall 45 are then lifted and the slide is moved in the direction of the arrow 55, whereby the portion 7b of the knitted article 7 is run onto the points.

The modified embodiment of the guide A shown in FIGS. 18 to 20 differs from its embodiment in FIGS. 7 and 9 firstly in that the wall 19 is formed at the top of its face 19a with a step 19d adapted to abut the portion of the strip edge 4 situated on the side of the section 15 turned towards the face 1a of the strip, FIG. 8.

The face 19b of the wall is in turn formed with a longitudinal through recess 19e adapted to receive one half of the thickened portion 10 on the second tab. The face 19a of the wall 19 is moreover formed with a groove 19f, FIG. 19, which lets the points through. Moreover, the plate 20 starts a certain extent off the edge 19g of the wall 19 to accommodate a disc-shaped brush 56 rotating in the direction of the arrow 57 by an electric motor or a drive derived from a rotary member of the linking machine (not shown). The brush is conveniently supported by any of the stationary components 20, 19 and 22 and is tangential to the face 19b of the wall 19 in order to stretch the section 15 of the first tab on the strip and insert the section 16 into the groove and beneath the edge 20a of the plate 20, respectively. In order to separate the bulged portion 16 from the section 15 of the first tab already on impaling of the edge 4 of the strip on the points, a cutter disc 58 is rotatably mounted in the plate 20 and rotated such as by an electric motor 59 beneath the roller 27 which can then be supported by the plate 22. The disc 58 is situated above the plate 20 and is coaxial with the roller 27 and of a diameter such that its circumference finds its way over the top edge 60 of an extension 61 on the wall 19 situated beneath the points 6. In the above-described structure the guide A may end at the level of the rollers 27 and is therefore shorter than the guide shown in FIGS. 7 and 9.

The finished article obtained after completion of the seam is shown in FIG. 13, in which a portion of the section 15 of the first tab on the strip and its respective section 16, as well as the second tab 9, 10 are shown by dotted lines to denote that they have been removed during impaling by means of the guides A, C, before effecting the seam.

In the case in which the points 6 are inclined with respect to the horizontal, the wall 19 should be perpendicular to the tangent plane to the frusto-conical zone traversed by the points.

What we claim is:

1. A method of attaching binding strips to parts of knitted articles of wear on a linking machine, comprising:

a. providing a knitted binding strip having auxiliary longitudinal tabs (2, 3, 9, 10, 15, 16) extending from the opposite edges (4,5) of the actual strip (1) to be attached to the knitted article (7);

b. running the knitted article (7) and strip (1) onto the points (6) on the rotary dial (12) of a linking machine in such manner that the strip takes a channel shape, one at least (2, 15, 16) of said tabs being juxtaposed on the inner channel face (1a), in such manner that the marginal portion (7b) of said knitted article (7) extends a certain length within the channel;

c. forming on said linking machine a chain stitch (8) joining the opposite faces of the strip (1) to the knitted article (7).

2. A method as claimed in claim 1, wherein the auxiliary tabs (2, 3, 9, 10, 15, 16) on the binding strip at least at their portions adjacent the knit of the actual strip (1) are smaller in thickness than the actual strip.

3. A method as claimed in claim 2, wherein at least one of the auxiliary tabs on the strip is so arranged that one face thereof is in continuation of a surface (1a) of the actual strip (1), adapted to form the inner face of the channel after impaling the strip on the points (6) on the rotary dial of the linking machine.

4. A method as claimed in claim 3, wherein the auxiliary tabs on the strip are in part at least knitted from a yarn other than the yarn of the actual strip.

5. A method as claimed in claim 4, wherein the auxiliary strip tab is in part at least knitted from elasticized yarn.

6. A method as claimed in claim 2 wherein the auxiliary tabs on the strip include a first section (9, 15) adjacent the knit of the actual strip (1) smaller in thickness than the strip knit, and a further marginal section (10, 16) of increased thickness with respect to the first section (9, 15)

7. A method as claimed in claim 6, wherein the thickness of said second section (10, 16) equals the thickness of the strip knit (1).

8. A method as claimed in claim 6, wherein the free margin of the second section is provided with a selvedge, the first section (9, 15) being substantially arranged in the longitudinal middle plane of the strip knit (1).

9. A method as claimed in claim 6 further comprising running the strip and article to be joined on the points (6) of the rotary dial of the linking machine by arranging both longitudinal tabs on the strip within the channel formed by bending over the strip proper (1) and removing the second thicker section of the tabs before completing the seam.

10. A method as claimed in claim 6, wherein the first sections (9, 15) of the auxiliary tabs extending beyond the opposite edges (4, 5) of the strip (1) are co-planar with the common longitudinal middle plane of their respective second sections (10, 16) of increased thickness and of the strip knit (1).

11. A linking machine provided with a bedplate, a rotary dial having points thereon, said dial being rotatable about said stationary circular bedplate, and a guide adapted to assist in impaling knitted goods on said points, the said guide comprising:

a vertical wall (19) situated in a plane intersecting the annular path of the points (6), extending from a region situated externally of the said path substantially at least to the outer circumference, defined at the top in part by a straight edge (19c) slightly above the surface over which the points (6) of the linking machine revolve;

a first horizontal elongated plate (22) arranged above the said plane on which the points (6) revolve, formed with a straight edge (22b) turned towards the outside of the path of the points (6) and extending parallel to said vertical wall (19), the said plate (22) defining with the top edge (19c) of the said vertical wall (19) a slit;

a second horizontal elongated plate (20) arranged on the side of the said vertical wall (19) remote from the points (6), beneath the plane in which the points revolve, formed with a rectilinear edge (20a) extending parallel to the said vertical wall (19) and defining with the latter a slit substantially equal in width to said first mentioned slit, the rectilinear edge of said second plate and the straight edge of said first plate (22) are disposed in spaced apart relation on opposite sides of said vertical wall;

and means for securing the said wall and said plates to the stationary circular bedplate of the machine.

12. A machine as claimed in claim 11, wherein said guide device further comprises a roller (27) formed with a circumferential groove, mounted for free rotation in the guide device near the end of said vertical wall (19) near the points (6) in a position such that the points extend through said circumferential groove.

13. A machine as claimed in claim 12 wherein said guide device comprises means for severing a portion of a strip of knitted goods during impaling of the edge of the strip on the points (6).

14. A machine as claimed in claim 13 wherein said severing means comprises a rotary cutter disc (58) situated beneath the roller (27) coaxially with the latter and above the said second plate (20), the vertical wall (19) having an extension (60) extending at least to the region at which the said cutter disc (58) is least spaced from the rotary dial (12) carrying the points (6).

15. A machine as claimed in claim 11, wherein the end of said second plate (20) extends beyond the end of said vertical wall (19) remote from the points.

16. A machine as claimed in claim 15 further comprising means adapted to stretch the knitted strip over the top edge (19c) of the said vertical wall (19).

17. A machine as claimed in claim 16 wherein said means comprises a brush (56) in the form of a rotary disc arranged between the end of said vertical wall (19) remote from the points (6) and said second horizontal plate (20), the axis of said brush being inclined through 45° to said second plate.

18. A machine as claimed in claim 11 further comprising a second guide device (B) having a pair of plates (29, 30) defining a through slot (31), the plates being slightly spaced above the annular path of the points (6) so that the slot intersects the region of the circle (39) over which the points travel, the second device comprising a slide (33) adapted to support the said plates (29, 30) mounted on the stationary structure of the machine for movement over an annular path the axis of which coincides with the rotational axis of the dial (12) carrying the points (6).

19. A machine as claimed in claim 18 further comprising a third guide device (C) includes a U-shaped channel (43) opening upwardly, extending towards the inside of the annular path of the points (6), the said third device including a slide (49) adapted to support the said channel (43) and mounted on the stationary machine structure (38) for movement over an annular path, the axis of which coincides with the rotational axis of the rim (12) carrying the points (6) between the said first and second mentioned guides (A, B).

*20. A knitted binding strip adapted to form the trim along the edge of a garment comprising a main strip portion having a predetermined thickness and at least one auxiliary longitudinal tab having a thickness less than the thickness of said main strip knitted along an edge of said main strip.*

*21. A knitted binding strip as set forth in claim 20 further comprising an additional auxiliary longitudinal tab having a thickness equal to the thickness of said first-mentioned tab knitted along the opposite edge of said main strip.*

*22. A knitted binding strip as set forth in claim 21 wherein at least one of said auxiliary tabs on said strip is so arranged that one face thereof is in continuation of a surface of said main strip adapted to form the inner face of a channel after folding of said strip longitudinally.*

*23. A knitted binding strip as set forth in claim 21 wherein said auxiliary tabs on said strip are in part at least knitted from a yarn other than the yarn of the main strip.*

*24. A knitted binding strip as set forth in claim 23 wherein said auxiliary tabs are in part at least knitted from elasticized yarn.*

*25. A knitted binding strip as set forth in claim 21 wherein at least one of said auxiliary tabs includes a first section adjacent the main strip smaller in thickness than said main strip and a further marginal section of increased thickness with respect to said first section.*

*26. A knitted binding strip as set forth in claim 25 wherein the thickness of said marginal section equals the thickness of said main strip.*

*27. A knitted binding strip as set forth in claim 25 wherein said first section is knitted at least in part from a separating thread to facilitate separation of said marginal section from said first section after the binding strip is secured to a garment.*

*28. A method of attaching a knitted binding strip to a knitted article comprising providing a knitted binding strip having auxiliary longitudinal tabs extending from the opposite edges of the actual strip to be attached to the knitted article, folding the strip into a channel-shaped binding strip about an edge of said article with at least one of said tabs being within the channel-shaped binding strip and securing said strip to said channel-shaped binding edge by stitching through said article, and said channel-shaped binding strip.*

*29. A method of attaching a knitted binding strip to a knitted article as set forth in claim 28 further comprising juxtaposing the other of said tabs on the inner channel face prior to securing said binding strip to said article.*

* * * * *